June 10, 1958 R. F. FOSTER 2,838,618
NOISE CANCELLING CIRCUIT
Filed March 31, 1955
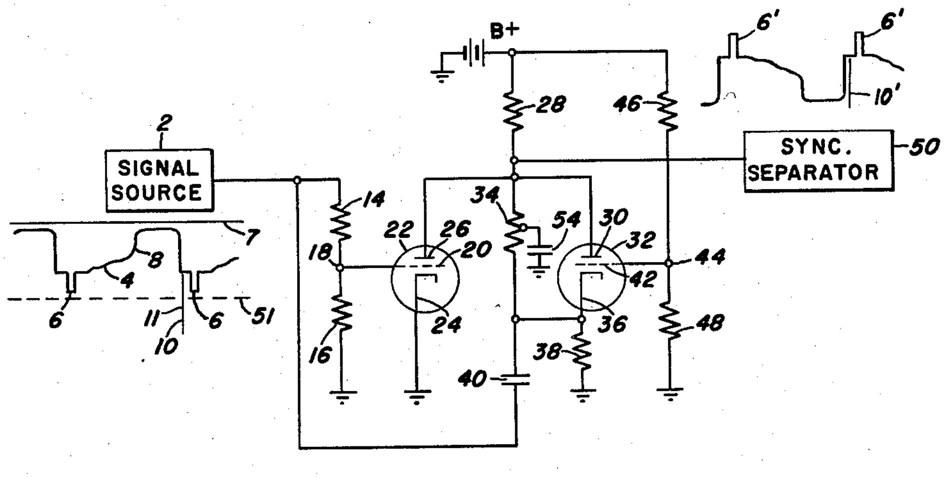
INVENTOR:
RAYMOND F. FOSTER,
BY Donald N. Timbie
HIS ATTORNEY.

United States Patent Office 2,838,618

Patented June 10, 1958

2,838,618

NOISE CANCELLING CIRCUIT

Raymond F. Foster, Syracuse, N. Y., assignor to General Electric Company, a corporation of New York Application March 31, 1955, Serial No. 498,365

5 Claims. (Cl. 179—171)

This invention relates to an improved noise cancelling circuit of a type wherein noise pulses extending beyond a given level (hereinafter referred to as the noise clipping level) are extracted from a signal inverted in polarity and recombined with the signal so as to tend to invert the noise pulse in the original signal.

Although circuits of this type may be used in various types of equipment, they have been particularly useful in preventing pulses of noise from interfering with the proper operation of circuits for separating the synchronizing signals from the rest of the video train. As is well known, the synchronizing signals are of greater amplitude than any other transmitted signal. For various reasons, the noise pulses extend in the same direction as the synchronizing pulses and under weak signal conditions are several times as large and hence, when they are applied to peak detector circuits having capacitors that are normally charged by the synchronizing pulses, these same capacitors also tend to be charged by the noise pulses. If the noise pulses are of sufficient amplitude relative to the synchronizing pulses, the capacitors of the peak detector circuits are overcharged. Until this excess charge leaks off, the synchronizing pulses are prevented from reaching the output of the separator circuit. It is generally desirable that the noise clipping level of the noise inverter be set just above the tips of the synchronizing pulses so that no pulses any higher than the synchronizing pulses are applied to the separator circuit. In some cases it may be desired to set the noise clipping level just below the tips of the synchronizing pulses. Hence, when the received signals are weak, the noise clipping level should be set at a low level and when the received signals are strong, the noise clipping level can be set at a higher level. In previous noise cancelling circuits the noise clipping level has been set by switches. However, a switch can only set the noise clipping level at a limited number of values and optimum operation for all received signal strengths is not possible.

Accordingly, it is an object of this invention to provide an improved noise cancelling circuit wherein the noise clipping level is varied in accordance with the strength of the received signals.

One of the disadvantages of previous noise cancelling circuits is that they have tended to alter the amplitude of the synchronizing pulses under strong signals.

It is, therefore, another object of this invention to provide an improved noise cancelling circuit that does not alter the amplitude of the synchronizing pulses.

Briefly, these objectives, as well as other advantages, may be achieved in accordance with this invention as follows: As in previous circuits, the video signal train with its attendant noise pulses is applied to control electrodes of two electric valves in such manner that the outputs of the valves have opposite polarities. One of the valves reproduces the video signal at its output with reversed polarity. The other valve is biased so as to conduct only during noise pulses that extend above the noise clipping level determined by the signal strength.

Hence, the noise clipping level is variable and adjusts itself for optimum operation at all times and conditions.

The manner in which the above objects and advantages may be attained by this invention will be more apparent after the following discussion of the drawing. Assume, for purposes of illustration only, that a source 2, which for example may be a diode detector, provides signals, as indicated at 4, that conform to present television standards. The synchronizing pulses 6 are negative with respect to the ground potential 7 and extend into a region in which the video signals 8 are never intentionally placed. Assume further that a pulse 10 of noise occurs at any point, in the received signal. A voltage divider in the form of series impedances, here shown as resistors 14 and 16, is connected between the output of the source 2 and ground. The junction 18 of these impedances is connected to an input electrode, here indicated as being a grid 20 of a triode 22 that serves as a sync amplifier. The cathode 24, another input electrode of the triode 22, is connected to ground and its output electrode, herein indicated as being an anode 26, is connected to a point of B+ potential via a load impedance, here shown as a resistor 28. Hence, the video signal 4 is inverted and appears across the load impedance 28 with the synchronizing pulses extending in a positive direction. At some point, such as indicated by the numeral 11 in the noise pulse 10, the grid 20 is driven beyond cut-off so that the noise pulse is reduced at the anode 26 relative to the rest of the signal. The anode 26 of the triode 22 is directly connected to an anode or output electrode 30 of a noise cancelling triode 32. The anode 26 is also coupled via a resistor 34 to a cathode 36 of the noise cancelling triode 32. The cathode 36 of the noise cancelling triode 32 is connected to ground via a cathode resistor 38. The signals provided by the source 2 are coupled via a capacitor 40 to the cathode or input electrode 36 of the noise cancelling triode 32. Another input electrode, grid 42, of the noise cancelling triode is established at a positive potential with respect to ground by virtue of its connection to a junction 44 of resistors 46 and 48 that are connected in series between a point of B+ and ground. The anodes 26 and 30 are connected to a sync separator circuit 50.

The operation and design considerations of the circuit just described are as follows: It will be noted that the source 2 is direct current coupled to the anode 26 of the sync amplifier triode 22 so that both low and high frequencies are amplified thereby. Actually, the low frequencies are so low that they may be thought of as being D.-C. content of the signal. Looking from the anode 26 toward ground, the impedance for low frequencies is largely determined by the resistors 34 and 38 as the capacitor 40 has such value as to present a high impedance for these frequencies. The impedance of the source 2 is assumed to be relatively small. The amplitude of the low frequencies is determined by the amplitude of the synchronizing pulses 6 of the wave 4 and hence is proportional to the strength of the received signals. Thus, the voltage of the cathode 36 becomes increasingly positive as the strength of the signals supplied by the source 2 increases. The portion of the low frequency voltage applied to the cathode 36 is proportional to the resistance of the resistor 38 divided by the sum of the resistances of the resistors 34 and 38. With proper selections of circuit values, the noise cancelling tube 32 may be biased beyond cut-off by a number of volts equal to the voltage of the tips of the sync pulses 6 as they appear at the cathode 36. Hence, only noise pulses extending below the dotted line 51 will cause the noise cancelling tube 32 to conduct.

On the other hand, the capacitor 40 has such capacitance as to present a very low impedance to the higher video frequencies so that the series impedance of the capacitor 40 and the source 2 for high frequencies is very low. If the resistance of the resistor 34 is much larger than the series impedance, very little high frequency energy will be coupled from the anode 26 to the cathode 36 and the resistors 34, 38 and the capacitor 40 are seen to be a low-pass filter. However, high frequency energy that forms most of the energy in the noise pulses 10 may be coupled to the cathode 36 from the source 2 as the impedance of the capacitor 40 is low for these frequencies. Because the source 2 has a low impedance, most of the energy appears at the cathode 36.

In order that the anodes 26 and 30 not be loaded down for any frequencies, it is desirable to make the value of the resistor 34 rather large and it may be in the order of several hundred thousand ohms.

The desirability of applying a positive voltage to the grid 42 of the noise cancelling triode 32 may be explained as follows: Two conditions should be met in order to obtain optimum operation. One of them is that when no signals are applied to the circuit, the cancellation tube should be biased at or near cut-off. The other condition is that as the applied signal strength increases, the bias on the cancellation tube should increase at a rate sufficient to prevent the sync pulses themselves from producing currents in the cancellation tube, for in this way the sync pulse shapes are least affected. If the grid 42 is grounded, a value of the cathode resistor 38 that is large enough to meet the first condition will be too large to meet the second condition. The rate of change of bias would be sufficient, but the bias at no signal condition would be far beyond instead of just at the cut-off point. This means that the noise cancelling tube would not conduct on low amplitude impulse as much as desired. On the other hand, if the value of the cathode resistor were small enough to meet the first condition of just cutting the tube 32 off at no signal condition, it would not produce a sufficiently fast rate of change in bias as the signal level increased and hence, would not meet the second condition. However, if it is made large enough to meet the second condition, it can be prevented from overbiasing at a no signal condition by biasing the grid positively as shown.

The purpose of the voltage divider formed by resistors 14, 16 is to reduce the amplitude of the noise pulses that are to be cancelled at the anode 26 of the sync amplifier. Of course, this also reduces the amplitude of the sync pulses 6, but it has the advantage of insuring the cancellation of the noise pulses and minimizing the effect of the dynamic input capacity of the amplifier on the signal source. This is especially advantageous when the gain of the sync amplifier tube 22 is more than sufficient. Alternatively, the voltage divider could be dispensed with if the gain of the sync amplifier tube 22 were reduced. However, it is generally cheaper to use a twin triode tube in which the gains of the two triode sections are just alike.

When the noise pulses are of large amplitude, a large portion of them, for example below the point 11, is prevented from producing an amplified output at the anode 26 of the sync amplifier 22 owing to the fact that they cut the tube off. However, this same amplitude portion is capable of increasing the current through the cancellation tube 32.

The overall operation of the noise cancelling circuit is as follows: At a no signal condition, the noise cancellation tube is biased at or near cut-off. Whatever the strength of the signals, bias at the tube 32 is adjusted by the action of the resistors 34, 38 and the capacitor 40 so as to always permit the portion of the pulses extending beyond the sync pulses to produce current in the tube 22. As the current is opposite to the currents caused to flow in the sync amplifier 22 by the same noise pulses, a cancellation takes place in the load resistor 28. Generally, the cancellation currents will be greater so that the original noise pulses 10 are inverted as indicated in the wave 32 by the numeral 10'.

The low frequencies present in the bias voltage applied to the cathode 36 have not produced difficulties, but they could be further reduced by additional filtering as by a capacitor 54 connected between a point on the resistor 34 and ground.

It should also be understood that the type of electrical amplifying device used does not matter. All that is necessary is that signals be applied to an output circuit with opposite polarities and that the low frequency output of one path be used as a source of bias for the other, the bias being of such magnitude that only a portion of noise pulses extending beyond a predetermined level are capable of rendering said other path conductive.

Those skilled in the art will understand that if positive video signals are provided by the source 2, they would be applied to the cathode 24 of the sync amplifier 22 and would be coupled to the grid 42 of the cancellation amplifier 32. However, it is believed that the arrangement shown in the drawing is to be preferred.

The following values of the various circuit parameters have been found to operate very well in a circuit designed to eliminate noise from a television signal. Those skilled in the art will readily appreciate that variations in these values can be made without departing from the teachings of the invention. It will also be apparent that changes in the type of amplifier or in the types of signal applied to the circuit may require different circuit parameters. Therefore, the values of the circuit parameters are presented only for the purpose of making a full disclosure of one circuit that functions in accordance with the principles of this invention to eliminate noise from one type of signal.

| | | |
|---|---|---|
| $R_{14}$ | ohms | 10,000 |
| $R_{16}$ | do | 10,000 |
| $R_{28}$ | do | 39,000 |
| $R_{34}$ | do | 300,000 |
| $R_{38}$ | do | 120,000 |
| $R_{46}$ | do | 180,000 |
| $R_{48}$ | do | 22,000 |
| $C_{40}$ | $\mu$f | 0.15 |
| B+ | volts | 250 |

The amplifiers 22 and 32 are halves of a double triode type 12AT7.

While I have illustrated a particular embodiment of my invention, it will of course be understood that I do not wish to be limited thereto, since various modifications both in the circuit arrangement and in the instrumentalities may be made, and I contemplate by the appended claims to cover any such modifications as fall within the true spirit and scope of the invention.

What I claim as new and desire to secure by Letters Patent of the United States is:

1. A noise cancelling circuit comprising, in combination, a first electron discharge device having an anode, a control grid and a cathode, a second electron discharge device having an anode, a control grid and a cathode, an input terminal, a direct current coupling circuit connected between said terminal and said control grid of said first electron discharge device, a connection between said cathode of said first electron discharge device and ground, a source of positive potential, a load impedance connected between said source and said anodes of said first and second electron discharge devices, a resistor connected between said anodes of said first and second electron discharge devices and said cathode of said second electron discharge device, a cathode resistor connected between said cathode of said second electron discharge device and ground, and a capacitor connected between said terminal and said cathode of said second electron discharge device.

2. A noise cancelling circuit as set forth in claim 1 wherein a circuit is provided for establishing said control grid of said second electron discharge device at a positive potential with respect to ground.

3. A noise cancelling circuit as set forth in claim 1 wherein a capacitor is connected between an intermediate point on said resistor and ground.

4. A noise cancelling circuit as set forth in claim 1 wherein said direct current coupling circuit is a voltage divider comprised of series resistors connected between said terminal and ground and wherein a direct current coupling circuit is connected between said control grid of said first electron discharge device and a point between said resistors.

5. A circuit for reducing the amplitude of high frequency noise pulses extending beyond the synchronizing pulses of a television signal in which the synchronizing pulses extend beyond the video signals, comprising in combination a first amplifier having an anode, a control grid and a cathode, a low impedance source of television signals, means for direct current coupling said source between said control grid and said cathode in such polarity that the synchronizing pulses and the noise pulses tend to make said control grid positive with respect to said cathode, a second amplifier having an anode, a control grid and a cathode, a first resistor connected between said anodes and said latter cathode, a second resistor connected between said latter cathode and said cathode of said first amplifier, a capacitor connected between the side of said source connected to said grid of said first amplifier and said cathode of said first amplifier, a source of operating potential having positive and negative terminals, a load impedance connected between said positive terminal of said latter source and said anodes of said first and second amplifiers, a connection between the negative terminal of said latter source and said cathode of said first amplifier, said capacitor being of such value that its impedance for the frequencies included in the noise pulses is low, the value of said second resistor being such as to be comparable to the impedance of said capacitor for the frequencies of said noise pulses, thereby permitting the bias on said cathode of said second amplifier to follow the variations in the amplitude of the low frequencies of said television signal and yet follow the high frequencies of said noise pulses.

References Cited in the file of this patent

UNITED STATES PATENTS

| | | |
|---|---|---|
| 2,183,731 | Wright | Dec. 19, 1939 |
| 2,379,699 | Ford | July 3, 1945 |

OTHER REFERENCES

Institute of Radio Engineers Proceedings, vol. 28, No. 2, February 1940, pp. 59–66, Pedersen: "A distortion-free amplifier."

"Cathode-coupled wide-band amplifiers," by Sziklai and Schroeder, in I. R. E. Proceedings for October 1945.